(No Model.)
E. C. SELLE.
SLEIGH BRAKE.
No. 367,165. Patented July 26, 1887.
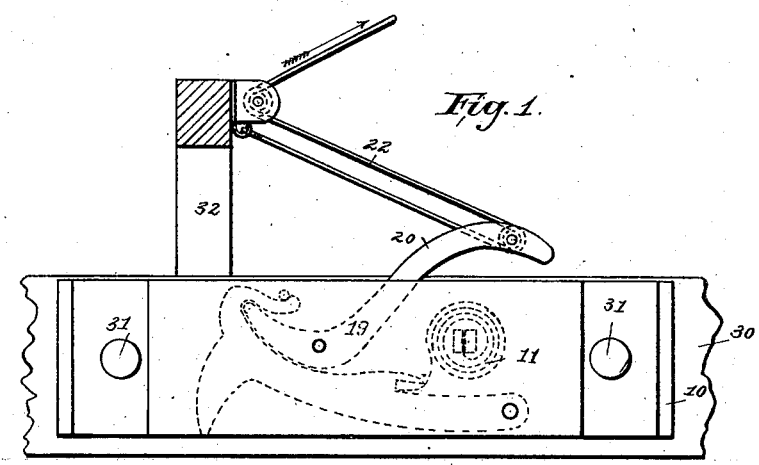
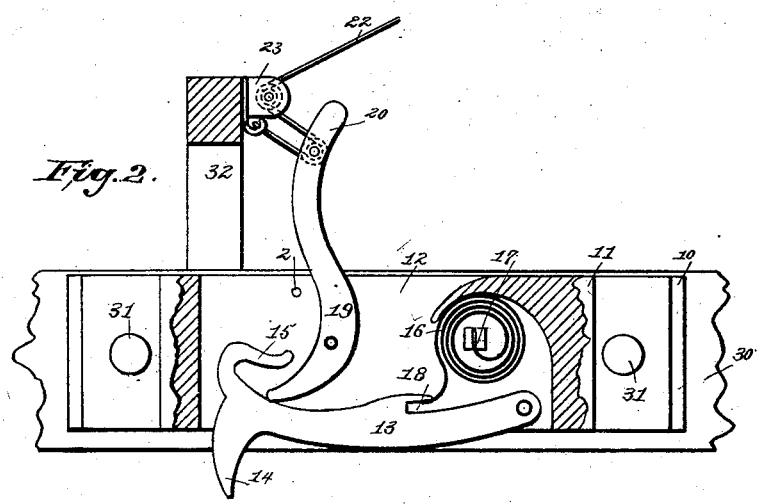
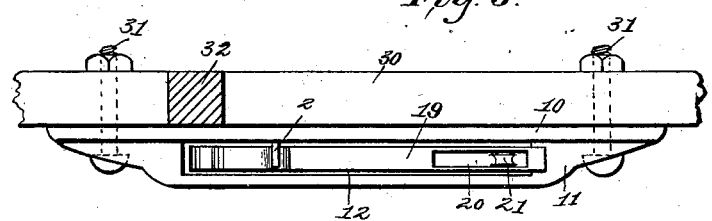
WITNESSES:
W. R. Davis
C. Sedgwick
INVENTOR:
E. C. Selle
BY Munn & Co
ATTORNEYS.

UNITED STATES PATENT OFFICE.

EDWARD C. SELLE, OF EMBARRASS, WISCONSIN.

SLEIGH-BRAKE.

SPECIFICATION forming part of Letters Patent No. 367,165, dated July 26, 1887.

Application filed May 20, 1887. Serial No. 238,833. (No model.)

*To all whom it may concern:*

Be it known that I, EDWARD CARL SELLE, of Embarrass, in the county of Waupaca and State of Wisconsin, have invented a new and Improved Sleigh Brake and Holder, of which the following is a full, clear, and exact description.

This invention relates to a novel apparatus that is applicable for use in connection with any of the ordinary forms of sleigh, the object of the invention being to provide an attachment which will act as a brake to impede the progress of the sleigh at times when the sleigh is passing over a downward incline, and which may be used as a holder for the sleigh when the sleigh is being drawn up an incline.

Reference is to be had to the accompanying drawings, forming a part of this specification, in which similar figures of reference indicate corresponding parts in all the views.

Figure 1 is a side view of a portion of a sleigh-runner, representing the same as it appears when provided with my improved sleigh holder and brake, one of the sleigh-knees being shown in section. Fig. 2 is a view with part of the brake-inclosing case removed, the parts being represented as they appear when the brake is thrown out for action; and Fig. 3 is a plan view of the parts, the operating-cord being removed.

In the drawings, 10 represents an inner plate, to which there is connected an outer plate, 11, that is provided with a recess, 12. In the recess so formed there is pivotally mounted a rearwardly-extending arm, 13, having a downwardly-extending claw, 14, and an upwardly and forwardly extending hook, 15. A spiral or other proper form of spring, 16, is mounted within the recess 12, one end of the spring being connected to a rigid block, 17, while the other end is arranged to enter a slot, 18, that is formed in the arm 13, the arrangement being such that the spring will normally act to hold the arm against a limit-pin, 2, as indicated by dotted lines in Fig. 1. Above the arm 13 I mount a lever, 19, the toe of which lever enters the space between the hook 15 and the main body of the arm 13. The plates 11 and 12 are connected to the runner 30 by means of bolts 31.

To the long arm 20 of the lever 19 I secure a sheave, 21, about which there is passed an operating cord or rope, 22, one end of the rope being secured to one of the sleigh-knees 32, passing thence about the sheave 21, to and about a sheave, 23, that is carried by the knee 32, and thence to the driver of the vehicle, the arrangement being such that by drawing the rope or cord 22 in the direction of the arrow shown in connection therewith in Fig. 1 the prong 14 of the arm 13 may be thrown downward to a position so that it will act as a brake or stop for the sleigh, in connection with which the apparatus is arranged.

With such an apparatus as has been described the driver will be able to regulate the speed at which it is desired to have the sleigh descend an incline, and if in ascending an incline it is desired to rest the horses the arm 13 may, through the medium of its operating mechanism, be moved so that the prong will be forced downward to position so that it will act as a stop.

Having thus fully described my invention, I claim as new and desire to secure by Letters Patent—

1. In a sleigh brake and holder, the combination, with an outer and an inner plate, of an arm, 13, mounted in a recess formed in one of the plates, a spring, 16, arranged in connection with the arm, a prong, 14, and hook 15, formed upon the arm, a lever, 19, mounted above the arm, and a cord, 22, which leads about a sheave carried by the lever, substantially as described.

2. In a sleigh brake and holder, the combination, with a plate, 10, of a recessed plate, 11, an arm, 13, pivotally mounted within the recess of the plate 11, and formed with a slot, 18, a prong, 14, and a hook, 15, a spring, 16, one end of which is connected to a post, 17, while the other enters the slot 18, a lever, 19, the toe of which enters the space between the hook 15 and the main body of the arm 13, a sheave, 21, carried by the lever 19, a sheave, 23, adapted for connection with one of the sleigh-knees, and a cord leading about the sheaves 21 and 23, substantially as described.

EDWARD C. SELLE.

Witnesses:
ALBERT SMITH,
R. G. GILSON.